US011428342B2

(12) United States Patent
Nakayama et al.

(10) Patent No.: US 11,428,342 B2
(45) Date of Patent: Aug. 30, 2022

(54) VACUUM EJECTOR AND SEAL VALVE UNIT (71) Applicant: SMC CORPORATION, Chiyoda-ku (JP)

(72) Inventors: Toru Nakayama, Soka (JP); Koji Sugano, Koshigaya (JP); Yasuhiro Ushijima, Joso (JP)

(73) Assignee: SMC CORPORATION, Chiyoda-ku (JP)

( * ) Notice: Subject to any disclaimer, the term of this patent is extended or adjusted under 35 U.S.C. 154(b) by 511 days.

(21) Appl. No.: 16/439,764

(22) Filed: Jun. 13, 2019

(65) Prior Publication Data
US 2019/0382215 A1  Dec. 19, 2019

(30) Foreign Application Priority Data

Jun. 15, 2018  (JP) .............................. JP2018-114626

(51) Int. Cl.
| *F16K 31/122* | (2006.01) |
| *F04F 5/52* | (2006.01) |
| *F04F 5/20* | (2006.01) |
| *F04F 5/44* | (2006.01) |

(52) U.S. Cl.
CPC ............ *F16K 31/1223* (2013.01); *F04F 5/20* (2013.01); *F04F 5/52* (2013.01); *F16K 31/1221* (2013.01); *F04F 5/44* (2013.01)

(58) Field of Classification Search
CPC ....... F04F 5/20; F04F 5/52; F04F 5/44; F16K 31/1221; F16K 31/1223; B65G 47/91; F02M 35/10091
See application file for complete search history.

(56) References Cited

U.S. PATENT DOCUMENTS

| 4,402,651 A | * | 9/1983 | Ise | ............................. | F04F 5/20 |
| | | | | | 137/271 |
| 8,043,071 B2 | * | 10/2011 | Fukano | ...................... | F04F 3/00 |
| | | | | | 417/187 |
| 2003/0180154 A1 | * | 9/2003 | Yamazaki | .................. | F04F 5/52 |
| | | | | | 417/187 |
| 2005/0118032 A1 | * | 6/2005 | Nagai | ....................... | F04F 5/46 |
| | | | | | 417/183 |

FOREIGN PATENT DOCUMENTS

| JP | 08-068400 | 3/1996 |
| JP | 2001-124000 A | 5/2001 |
| JP | 2003-222100 A | 8/2003 |

OTHER PUBLICATIONS

The partial European Search Report dated Oct. 31, 2019 in European Patent Application No. 19179664.8, 12 pages.
Japanese Office Action dated Jul. 21, 2020 in Japanese Patent Application No. 2018-114626 (with unedited computer genereated English translation), 6 pages.

* cited by examiner

*Primary Examiner* — Umashankar Venkatesan
(74) *Attorney, Agent, or Firm* — Oblon, McClelland, Maier & Neustadt, L.L.P.

(57) ABSTRACT

In a vacuum ejector provided with a seal valve mechanism between a vacuum generation mechanism and a break flow path, the seal valve mechanism includes a valve plug that is biased toward a sealing opening from the break flow path side to block the seal opening, and is configured to open the seal opening by moving the valve plug away from the seal opening using a piston portion that operates according to supply air supplied from the vacuum generation mechanism.

3 Claims, 10 Drawing Sheets

VACUUM EJECTOR AND SEAL VALVE UNIT

CROSS-REFERENCE TO RELATED APPLICATION

This application is based upon and claims the benefit of priority from Japanese Patent Application No. 2018-114626 filed on Jun. 15, 2018, the contents of which are incorporated herein by reference.

BACKGROUND OF THE INVENTION

Field of the Invention

The present invention relates to a vacuum ejector and a seal valve unit, for supplying a negative pressure to a work device such as a suction pad.

Description of the Related Art

A conventional vacuum ejector is known that is used as a means of transporting a workpiece, for example. This vacuum ejector generates negative pressure by causing compressed air to flow through a diffuser (also referred to as an ejector portion or vacuum generation mechanism), thereby adhering the workpiece thereto via suction. Then, while maintaining the suction state, the workpiece is moved. After this, the workpiece is released at a prescribed position by releasing the suction state, thereby performing the transportation or the like of the workpiece.

In order to reliably release the workpiece, the conventional vacuum injector has a function to feed break air (compressed air) into the negative pressure flow path.

Japanese Laid-Open Patent Publication No. 08-068400 discloses a configuration for reliably breaking the negative pressure when releasing the suction state, by providing a seal valve between the negative pressure flow path and the diffuser.

SUMMARY OF THE INVENTION

However, depending on the usage, there are cases where break air with higher pressure is desired in order to remove a workpiece stuck to a suction pad or to remove dust and foreign material adhering to the workpiece.

In such a case, a structure is desired in which the seal valve operates reliably for higher-pressure breaking air, to provide a seal between the negative pressure flow path and the ejector portion (vacuum generation mechanism) that generates the negative pressure, without allowing the break air to flow out to the vacuum generation mechanism side.

Furthermore, there are cases where there is no desire for blowing high-pressure break air onto the workpiece, and therefore high pressure is not needed for the break air. In such a case, the high-cost seal valve is unnecessary, and the configuration of the apparatus is preferably made as simple as possible. Therefore, the seal valve is preferably removed from the vacuum ejector as necessary.

The vacuum ejector according to one aspect of the disclosure below comprises a supply port supplied with compressed air; a vacuum port connected to a suction unit; a vacuum generation mechanism configured to generate negative pressure due to an effect of supply air supplied from the supply port; a break valve configured to supply break air to the vacuum port; a supply flow path configured to connect the supply port and the vacuum generation mechanism, and including a supply valve therein; a negative pressure flow path configured to connect the vacuum generation mechanism and the vacuum port; a break flow path configured to connect the break valve and the negative pressure flow path; and a seal valve mechanism arranged in the negative pressure flow path between the vacuum generation mechanism and the break flow path, and configured to prevent the break air that passes through the break flow path to be supplied to the vacuum port from flowing out to the vacuum generation mechanism, wherein the seal valve mechanism is configured to enter an open state due to supply of the supply air from the supply valve, and enter a closed state when the supply of the supply air from the supply valve stops.

According to the vacuum ejector described above, the effect of the supply air (or break air) is unnecessary for setting the seal valve mechanism to the closed state. Therefore, even when the break pressure of the break air is high, it is possible to maintain the closed state. In other words, even when higher-pressure break air is supplied to the negative pressure flow path, the seal valve mechanism remains in the closed state, and therefore it is possible to reliably seal the negative pressure flow path.

In the vacuum ejector described above, the seal valve mechanism may include a seal opening formed by constricting a diameter of the negative pressure flow path; a valve plug configured to be biased toward the seal opening from the break flow path side to block the seal opening; and a piston portion configured to receive pressure of the supply air to move the valve plug in a direction away from the seal opening.

The vacuum ejector described above is configured to block the seal opening by biasing the valve plug of the seal valve mechanism toward the seal opening from the break flow path side. Therefore, even when the break pressure on the break flow path side has increased, the valve does not open and the negative pressure flow path is reliably sealed.

In the vacuum ejector described above, a constricted diameter portion with a diameter smaller than a diameter of the seal opening may be formed at a tip portion of the piston portion, and the constricted diameter portion may be configured to contact and push the valve plug to move the valve plug away from the seal opening.

By using the above configuration, it is possible to open the seal opening by causing the tip portion of the piston portion to press the valve plug through the seal opening. Since the tip portion of the piston portion has the constricted diameter portion with a smaller diameter than the seal opening, even when the piston portion pushes the valve plug, the seal opening is not blocked by the piston portion.

In the vacuum ejector described above, the seal valve mechanism may include a first elastic part configured to bias the valve plug toward the seal opening; and a second elastic body configured to bias the piston portion in a direction away from the valve plug.

By using the above configuration, even when the supply of the supply air is stopped, it is possible to reliably set the closed state by biasing the valve plug forming the seal valve mechanism toward the seal opening.

According to another aspect of the disclosure below, there is a seal valve unit that is attached in a freely detachable manner to a vacuum ejector that includes a supply port supplied with compressed air, a vacuum port connected to a suction unit, a vacuum generation mechanism configured to generate negative pressure due to an effect of supply air supplied from the supply port, a break valve configured to supply break air to the vacuum port, a supply flow path configured to connect the supply port and the vacuum generation mechanism, and including a supply valve therein, a negative pressure flow path configured to connect the vacuum generation mechanism and the vacuum port, and a break flow path configured to connect the break valve and the negative pressure flow path, the seal valve unit comprising a seal valve mechanism arranged in the negative pressure flow path between the vacuum generation mechanism and the break flow path, and configured to prevent the break air that passes through the break flow path to be supplied to the vacuum port from flowing out to the vacuum generation mechanism.

According to the seal valve unit described above, since the seal valve unit is configured to be freely attachable to the vacuum ejector, it is possible to configure the vacuum ejector to have the seal valve simply by attaching the seal valve unit to the vacuum ejector when high-pressure break air is needed.

In the seal valve unit described above, the seal valve mechanism may include a seal opening formed by constricting a diameter of the negative pressure flow path; a valve plug configured to be biased toward the seal opening from the break flow path side to block the seal opening; and a piston portion configured to receive pressure of the supply air to move the valve plug in a direction away from the seal opening.

The seal valve unit described above is configured to block the seal opening by biasing the valve plug of the seal valve mechanism toward the seal opening from the break flow path side. Therefore, even when the break air is taken into the negative pressure flow path through the break flow path side and the break pressure of the negative pressure flow path has increased, the valve does not open and the negative pressure flow path can be reliably sealed.

In the seal valve unit described above, a constricted diameter portion with a diameter smaller than a diameter of the seal opening may be formed at a tip portion of the piston portion, and the constricted diameter portion may be configured to contact and push the valve plug to move the valve plug away from the seal opening.

By using the above configuration, it is possible to open the seal opening by causing the tip portion of the piston portion to press the valve plug through the seal opening. Since the tip portion of the piston portion has the constricted diameter portion with a smaller diameter than the seal opening, even when the piston portion pushes the valve plug, the seal opening is not blocked by the piston portion.

In the seal valve unit described above, the seal valve mechanism may include a first elastic part configured to bias the valve plug toward the seal opening; and a second elastic body configured to bias the piston portion in a direction away from the valve plug.

By using the above configuration, even when the supply of the supply air is stopped, it is possible to reliably set the closed state by biasing the valve plug forming the seal valve mechanism toward the seal opening.

The seal valve unit may further comprise the vacuum port and the negative pressure flow path.

By using the above configuration, the negative pressure flow path of the seal valve unit and the vacuum ejector is shortened, and the apparatus configuration is simplified.

According to the one aspect described above, with the vacuum ejector, it is possible to realize a seal valve that operates reliably even when there is high-pressure break air. Furthermore, according to the other aspect described above, the seal valve can be configured as an attachable/detachable seal valve unit, and therefore the apparatus configuration of the vacuum ejector can be changed easily according to the intended use, simply by attaching or detaching the seal valve unit.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The following describes detailed examples of preferred embodiments of the present invention, while referencing the accompanying drawings. Dimensional ratios in the drawings are illustrative, and may differ from the actual ratios.

First Embodiment

Figure 1:
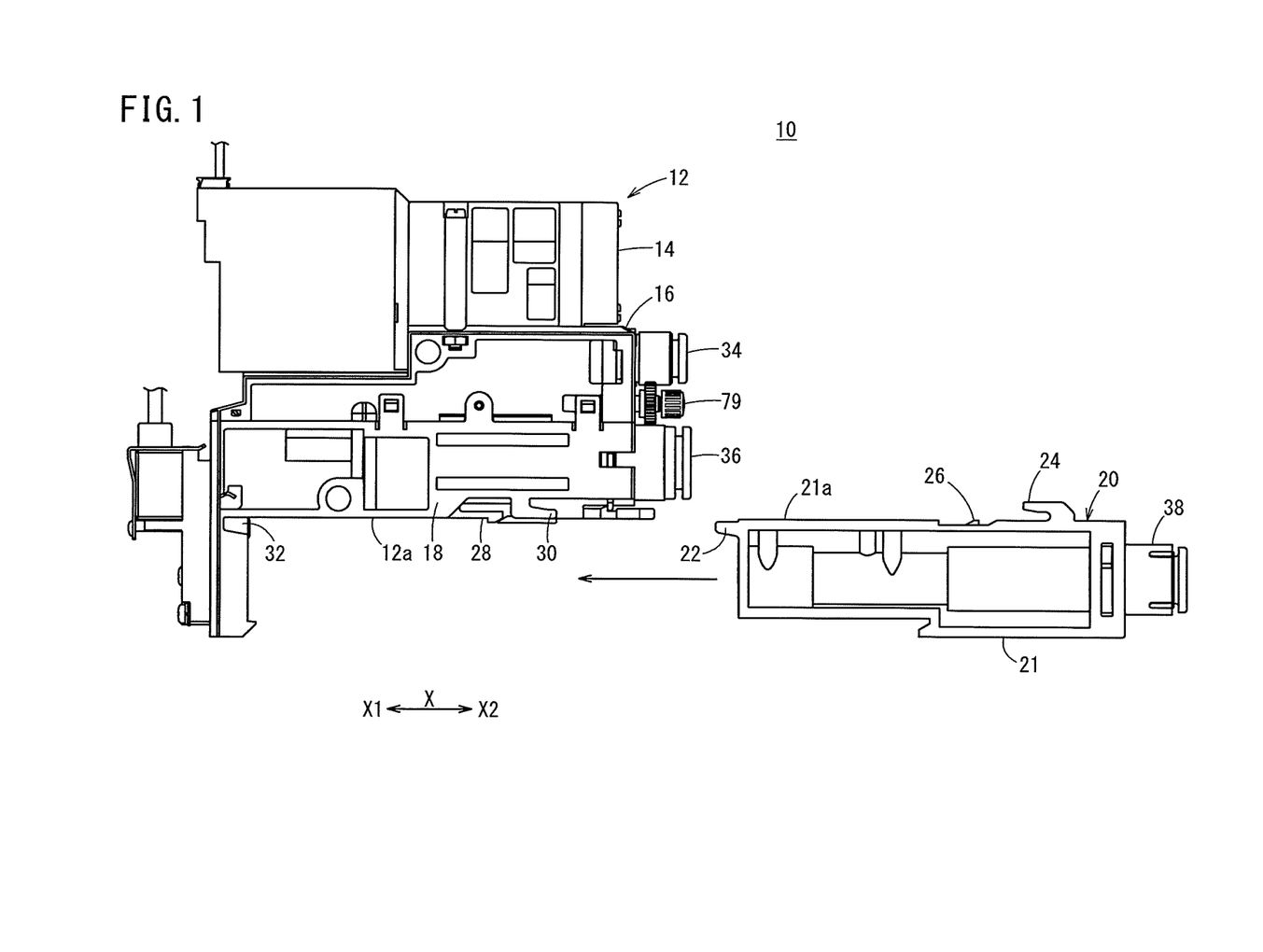
FIG. 1 is a side view showing a state in which the vacuum ejector and attachment unit according to a first embodiment of the present invention are separated.

A vacuum ejector 10 according to the present embodiment includes a main body 12 and an attachment unit 20 configured to be attachable and detachable to and from the main body 12, as shown in FIG. 1. The attachment unit 20 is provided with a vacuum port 38 connected to a suction pad or the like. As described further below, this attachment unit 20 includes a filter unit 20A (see FIG. 3) that houses only a suction filter 78 therein, without including a seal valve mechanism 70, and a seal valve unit 20B (see FIG. 4) that houses both the seal valve mechanism 70 and the suction filter 78 therein. The vacuum ejector 10 is used with one of the filter unit 20A and the seal valve unit 20B attached thereto as the attachment unit 20 corresponding to the intended use.

The main body 12 includes a valve unit 14 that switches the output to the vacuum port 38 between negative pressure and positive pressure, an ejector unit 18 that generates the negative pressure, and a flow path 16 that connects the valve unit 14 and the ejector unit 18. The flow path 16 is provided with a supply port 34 through which compressed air is supplied, and the compressed air flowing in from this supply port 34 is guided to the valve unit 14 and supplied to the ejector unit 18 as the supply air (compressed air) via the valve unit 14.

Figure 2:
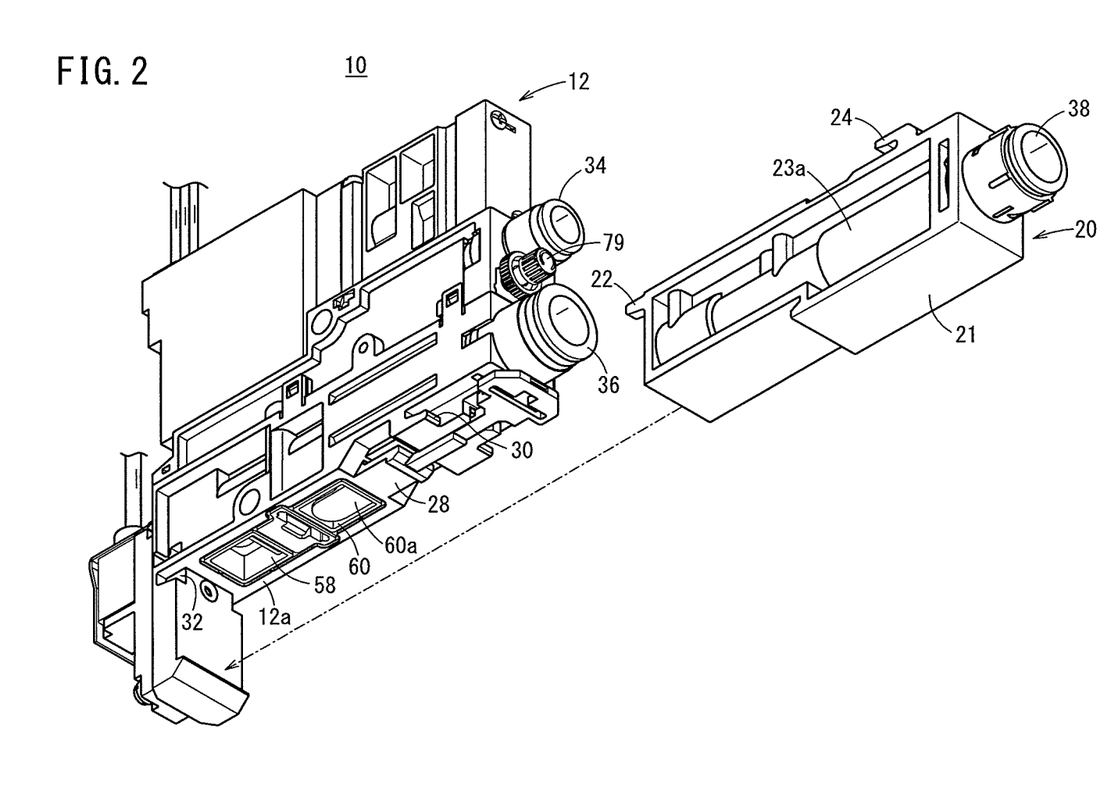
FIG. 2 is a perspective view of the vacuum ejector and the attachment unit of FIG. 1.

The ejector unit 18 is provided with a vacuum generation mechanism 50 (see FIG. 3) that generates the negative pressure based on the effect of the supply air. Furthermore, the ejector unit 18 is provided with an exhaust port 36 that discharges the supply air that has passed through the vacuum generation mechanism 50. As shown in FIG. 2, the negative pressure generated by the ejector unit 18 is supplied to the attachment unit 20, via connection openings 58 and 60 provided in the bottom portion of the main body 12. The attachment unit 20 is configured to transmit the negative pressure to the vacuum port 38 through the negative pressure flow path therein.

As shown in FIGS. 1 and 2, the attachment unit 20 includes a frame portion 21 formed with a rectangular shape, and a protruding portion 22 protruding to the X1 side, an engaging portion 24, and a protrusion 26 are formed on a connection surface 21a of this frame portion 21.

Furthermore, in a connecting portion 12a of the main body 12, a recessed portion 32 into which the protruding portion 22 is inserted, an engagement receiving portion 30 that engages with the engaging portion 24, and a lock piece 28 that elastically deforms to engage with the protrusion 26 and prevent the attachment unit 20 from falling off are provided. The attachment unit 20 is attached by inserting the protruding portion 22 into the recessed portion 32 of the main body 12 while sliding the attachment unit 20 in the direction of the arrow shown in FIG. 2, and engaging the engaging portion 24 with the engagement receiving portion 30 of the main body 12. The following describes each portion of vacuum ejectors 10A and 10B.

Figure 3:
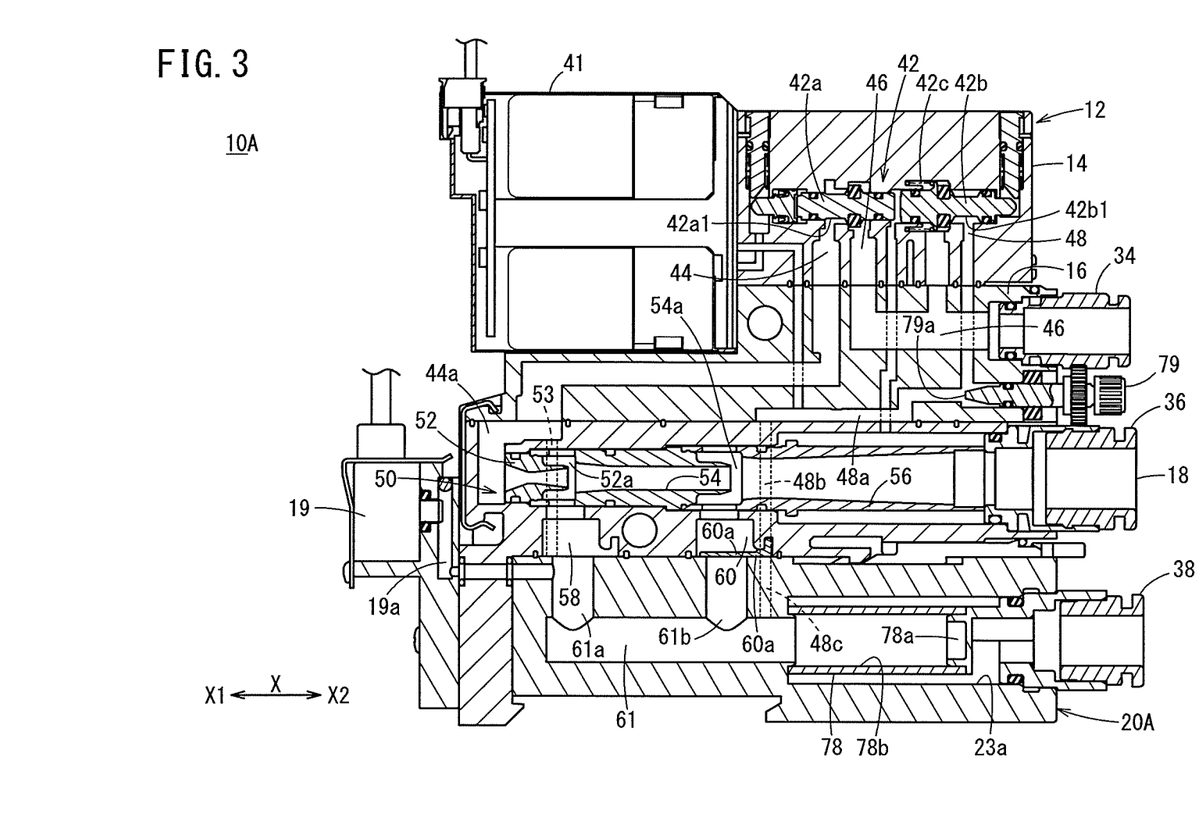
FIG. 3 is a cross-sectional view of a state in which a filter unit is attached to the vacuum ejector of FIG. 1, as the attachment unit.

As shown in FIG. 3, the vacuum ejector 10A is configured to have a filter unit 20A attached to the main body 12 as the attachment unit 20. The main body 12 includes the valve unit 14, the flow path 16, the ejector unit 18, and a solenoid valve unit 41.

The valve unit 14 includes a valve mechanism 42 that has a supply valve 42a and a break valve 42b, a supply flow path 44, an intake air flow path 46, and a break flow path 48. The intake air flow path 46 is a flow path that connects the supply port 34 of the flow path 16 with the supply valve 42a and the break valve 42b, and branches within the flow path 16 to connect to the supply valve 42a and the break valve 42b. The supply valve 42a is arranged between the intake air flow path 46 and the supply flow path 44. The break valve 42b is arranged between the intake air flow path 46 and the break flow path 48.

The solenoid valve unit 41 outputs pilot air to drive the supply valve 42a and the break valve 42b forming the valve mechanism 42. The supply valve 42a and the break valve 42b are configured as valves that operate in conjunction with each other on the same axis, and operate according to a pilot pressure supplied from the solenoid valve unit 41. A recessed portion 42a1 capable of joining the intake air flow path 46 and the supply flow path 44 is formed in the supply valve 42a. When the supply valve 42a is in a closed state, the recessed portion 42a1 is moved to a position where it is not in communication with the intake air flow path 46, and the supply valve 42a blocks the intake air flow path 46. On the other hand, a recessed portion 42b1 capable of joining the intake air flow path 46 and the break flow path 48 is formed in the break valve 42b. When the break valve 42b is in the closed state, the recessed portion 42b1 is moved to a position where it is not in communication with the intake air flow path 46, and the break valve 42b blocks the intake air flow path 46.

When the break valve 42b of the valve mechanism 42 is biased toward the supply valve 42a side, the break valve 42b is located at an open position to be in the open state. At this time, the supply valve 42a is pushed to be located at a closed position, such that the supply valve 42a is in the closed state. When the biasing of the break valve 42b is stopped, the break valve 42b returns to the closed position due to a spring 42c. At this time, the break valve 42b and the supply valve 42a are both in the closed state. Furthermore, when the pilot air is supplied to the supply valve 42a, the supply valve 42a moves to the open position to be in the open state. At this time, the break valve 42b is kept at the closed position due to the bias force from the spring 42c.

The flow path 16 includes the supply port 34, the supply flow path 44, the intake air flow path 46, the break flow path 48, and a break flow rate adjustment needle 79. The compressed air from a compressed air supply means (not shown in the drawings) is supplied from the supply port 34. The intake air flow path 46 is connected to the supply port 34. The intake air flow path 46 branches within the flow path 16, such that one of the branches is connected to the supply valve 42a and the other branch is connected to the break valve 42b.

The supply flow path 44 has one end thereof connected to the supply valve 42a and the other end thereof connected to a nozzle 52 of the ejector unit 18. In the flow path 16, the supply flow path 44 extends toward the end portion where the nozzle 52 of the ejector unit 18 is provided. The break flow path 48 is a flow path connecting the break valve 42b and a negative pressure flow path 61, and curves within the flow path 16 to extend toward the negative pressure flow path 61. The break flow path 48 penetrates through the ejector unit 18 to be in communication with the negative pressure flow path 61 of the filter unit 20A.

The break flow rate adjustment needle 79 is attached to a curved portion of the break flow path 48. The break flow rate adjustment needle 79 includes a tip portion 79a capable of being inserted into the break flow path 48, and can adjust the flow rate of the break air according to the gap between this tip portion 79a and the break flow path 48.

The ejector unit 18 includes the vacuum generation mechanism 50, the exhaust port 36, and the connection openings 58 and 60. The vacuum generation mechanism 50 includes the nozzle 52, a first diffuser 54, and a second diffuser 56. The base end side of the nozzle 52 is connected to a supply air intake portion 44a. The supply air intake portion 44a forms a portion of the supply flow path 44, and guides the supply air to the inlet of the nozzle 52. The nozzle 52 is a tube-shaped component having a midway portion with a constricted inner diameter, and the inlet thereof is connected to the supply air intake portion 44a. Furthermore, the first diffuser 54 and the second diffuser 56 are arranged in the stated order on the ejection side of the nozzle 52. The first diffuser 54 and the second diffuser 56 are components shaped as long tubes. The nozzle 52, the first diffuser 54 and the second diffuser 56 are arranged with gaps having prescribed widths therebetween. The exhaust port 36 is provided on the ejection side of the second diffuser 56.

A gap 52a between the nozzle 52 and the first diffuser 54 is in communication with the connection opening 58, and a gap 54a between the first diffuser 54 and the second diffuser 56 is in communication with the connection opening 60. A check valve 60a is provided at the end portion of the connection opening 60. The check valve 60a opens and closes according to the differential pressure between the connection opening 60 and the negative pressure flow path 61 (or negative pressure flow path 62 (see FIG. 4)).

Figure 4:
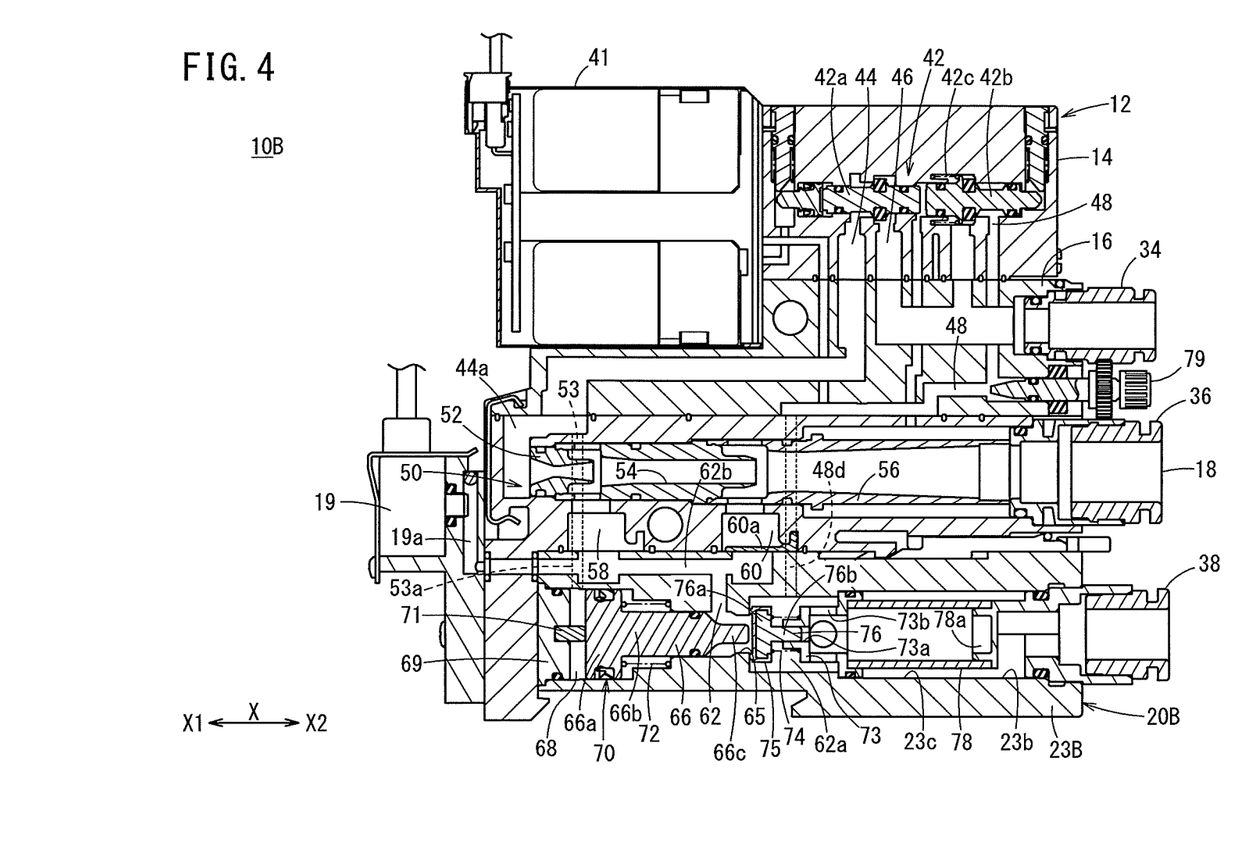
FIG. 4 is a cross-sectional view of a state in which a seal valve unit is attached to the vacuum ejector of FIG. 1, as the attachment unit.

Specifically, the check valve 60*a* is open when the negative pressure on the negative pressure flow path 61 (or negative pressure flow path 62) side is less than the negative pressure of the connection opening 60. On the other hand, the check valve 60*a* blocks the end portion of the connection opening 60 when the negative pressure on the negative pressure flow path 61 (or negative pressure flow path 62) side is greater than the negative pressure of the connection opening 60 by at least a prescribed value.

Furthermore, the ejector unit 18 is provided with a seal valve flow path 53 that is a flow path of the pilot air for driving the seal valve mechanism 70, described further below. The seal valve flow path 53 has one end thereof connected to the supply air intake portion 44*a*. The seal valve flow path 53 penetrates through the ejector unit 18, to have the other end thereof open in the surface on the attachment unit 20 side. It should be noted that, in a case where the attachment unit 20 is the filter unit 20A that does not include a seal valve, the seal valve flow path 53 is blocked by the filter unit 20A.

The filter unit 20A includes the vacuum port 38, a suction filter 78, the negative pressure flow path 61, and a break flow path 48*c*. The negative pressure flow path 61 extends along the longitudinal direction of the filter unit 20A, and branches therein into a first negative pressure flow path 61*a* and a second negative pressure flow path 61*b*. The first negative pressure flow path 61*a* is connected to the connection opening 58 of the ejector unit 18, and the second negative pressure flow path 61*b* is connected to the connection opening 60. Furthermore, a sensor flow path 19*a* that extends toward a pressure sensor 19 is connected to the first negative pressure flow path 61*a*. The break flow path 48*c* within the filter unit 20A has one end thereof connected to a break flow path 48*b* of the ejector unit 18, and the other end thereof is in communication with the negative pressure flow path 61.

A filter housing portion 23*a* is provided between the negative pressure flow path 61 and the vacuum port 38, and the suction filter 78 is arranged within this filter housing portion 23*a*. The suction filter 78 is a tube-shaped filter, has one end thereof connected to the negative pressure flow path 61 side, and has the other end thereof sealed by a port member 78*a*. The port member 78*a* acts as both a fitting body for the vacuum port 38 and an attachment position of the suction filter 78. An inside portion 78*b* of the suction filter 78 is in communication with the negative pressure flow path 61. The gap between the suction filter 78 and the filter housing portion 23*a* is in communication with the vacuum port 38. Incorrect operation and decreased functionality of the vacuum ejector 10A are prevented by having the suction filter 78 remove foreign material from the air.

The vacuum ejector 10A configured as described above operates in the manner described below. It is assumed that, in the vacuum ejector 10A, the supply valve 42*a* of the valve unit 14 is in the open state and the break valve 42*b* is in the closed state. The compressed air supplied from the supply port 34 passes through the supply valve 42*a* to be supplied to the vacuum generation mechanism 50 of the ejector unit 18 via the supply flow path 44. The supply air passes through the nozzle 52, the first diffuser 54, and the second diffuser 56 in the stated order, to be discharged from the exhaust port 36. At this time, the negative pressure is generated by suctioning air from the gaps 52*a* and 54*a*.

At this time, while the negative pressure is low, the check valve 60*a* provided to the connection opening 60 is opened in the flow direction such that negative pressure flows to both of the connection openings 58 and 60, but when the negative pressure is high, the check valve 60*a* enters the closed state such as shown in the drawing, such that only the negative pressure generated by the gap 52*a* via the connection opening 58 flows, thereby making it possible to generate high vacuum pressure.

The negative pressure generated by the vacuum generation mechanism 50 in this manner is transmitted to the negative pressure flow path 61 via the connection openings 58 and 60, and is transmitted to the vacuum port 38 side via the suction filter 78. Therefore, suction force is generated in the device such as the suction pad connected to the vacuum port 38.

Furthermore, when the break valve 42*b* of the valve unit 14 switches from the closed state to the open state, the supply valve 42*a* switches from the open state to the closed state, and the supply of the supply air to the supply flow path 44 is stopped. On the other hand, the compressed air supplied from the supply port 34 flows through the break valve 42*b* and into the negative pressure flow path 61 via the break flow path 48, as the break air. Therefore, the pressure of the negative pressure flow path 61 increases, and a portion of the break air flows to the vacuum port 38 through the suction filter 78. Furthermore, a portion of the break air is released from the exhaust port 36 via the connection openings 58 and 60 and the vacuum generation mechanism 50. Due to the break air flowing through the vacuum port 38, the vacuum state of the device connected to the vacuum port 38 is broken, and the suction is released.

The following describes the vacuum ejector 10B having the seal valve unit 20B attached as the attachment unit 20. As shown in FIG. 4, the seal valve unit 20B is attached to the vacuum ejector 10B.

The seal valve unit 20B includes a case 23B, and has the vacuum port 38, a break flow path 48*d*, the negative pressure flow path 62, the seal valve mechanism 70, and the suction filter 78 included within the case 23B.

The case 23B is provided with a penetration hole 23*b* that penetrates therethrough in the longitudinal direction. The vacuum port 38 is attached to the end on the X2 side of the penetration hole 23*b*. A filter housing portion 23*c* is provided in the penetration hole 23*b* in the portion contacting the vacuum port 38, and the suction filter 78 is arranged in this filter housing portion 23*c*. The suction filter 78 is tube-shaped and has one end that is connected to the port member 78*a* and held. One end of the suction filter 78 is sealed by the port member 78*a*. The other end of the suction filter 78 is connected to a support member 73 and held. The support member 73 is provided at the border between the filter housing portion 23*c* and the negative pressure flow path 62, and has an open portion 73*b* formed therein through which the negative pressure flow path 62 and the inside of the suction filter 78 are in communication. In this way, the inner circumferential side of the suction filter 78 is in communication with the negative pressure flow path 62, and the outer circumferential side of the suction filter 78 is in communication with the vacuum port 38. Furthermore, on the base end side (X1 side) of the support member 73, a guide hole 73*a*, into which a shaft portion 76*b* of a valve plug 76 is inserted to be supported, extends in the axial direction (X direction).

The negative pressure flow path 62 is a flow path connecting the suction filter 78 to the connection openings 58 and 60 of the ejector unit 18. The negative pressure flow path 62 includes a first flow path 62a extending in the longitudinal direction of the case 23B and a second flow path 62b that branches from the first flow path 62a to extend toward the connection openings 58 and 60 of the ejector unit 18. The first flow path 62a is in communication with the inside of the suction filter 78, and also in communication with the break flow path 48d. Furthermore, a seal opening 65 with a smaller inner diameter than other portions of the first flow path 62a is formed in the first flow path 62a. One end of the break flow path 48d within the seal valve unit 20B is connected to the negative pressure flow path 62 between the seal opening 65 and the suction filter 78. In other words, the break flow path 48 is connected to the negative pressure flow path 62 at a portion thereof closer to the vacuum port 38 than to the seal opening 65.

The second flow path 62b is connected to the connection openings 58 and 60 of the ejector unit 18, via the branching portion. The pressure sensor 19 is connected to the second flow path 62b via the sensor flow path 19a.

The seal valve mechanism 70 includes a valve plug 76 that blocks the seal opening 65 and a piston portion 66 that opens the seal opening 65 by moving the valve plug 76 away from the seal opening 65. The valve plug 76 is arranged on the suction filter 78 side of the seal opening 65.

The valve plug 76 includes a valve portion 76a formed with a greater diameter than the seal opening 65 provided to the first flow path 62a and a shaft portion 76b that extends from the center of the valve portion 76a. A seal member 75 is attached to the surface of the valve portion 76a, and the valve portion 76a blocks the seal opening 65 using this seal member 75. The shaft portion 76b is inserted into the guide hole 73a of the support member 73. The valve plug 76 can move in the direction of the X arrow while being guided by the guide hole 73a. A first elastic part 74 made from a coil spring, for example, is attached to the outside of the shaft portion 76b of the valve plug 76. One end of the first elastic part 74 contacts the support member 73, and the other end contacts the valve portion 76a of the valve plug 76. The valve plug 76 is biased toward the seal opening 65 side by the first elastic part 74.

The piston portion 66 is arranged between a pressure receiving chamber 68 and the negative pressure flow path 62. The pressure receiving chamber 68 is a portion that is sealed by an end cap 69. The piston portion 66 includes a pressure receiving portion 66a that is adjacent to the pressure receiving chamber 68, a main body 66b that is formed with a smaller diameter than the pressure receiving portion 66a, and a constricted diameter portion 66c that is formed at the tip side (X2 side) of the main body 66b. The pressure receiving portion 66a receives the pressure of the supply air to move the piston portion 66 in the X2 direction. The constricted diameter portion 66c is formed with a diameter that is smaller than the inner diameter of the seal opening 65, and is configured to be able to be inserted into the seal opening 65 without blocking the seal opening 65. Furthermore, a second elastic part 72 is formed on the outer circumference of the main body 66b. The second elastic part 72 is formed by a coil spring, for example, and biases the piston portion 66 in a direction (X1 direction) away from the seal opening 65. A regulating pin 71 that extends in the axial direction (X direction) is provided to the end cap 69. The piston portion 66 can move in the X1 direction until contacting the regulating pin 71. The seal valve flow paths 53 and 53a that branched from the supply flow path 44 are connected to the pressure receiving chamber 68, and the pressure receiving chamber 68 is configured to be able to take in the supply air.

The operation of the vacuum ejector 10B configured in the manner described above is described with reference to FIGS. 4 and 5. In the vacuum ejector 10B, the compressed air taken in from the supply port 34 is supplied to the supply valve 42a and the break valve 42b via the intake air flow path 46. When the supply valve 42a enters the open state due to the pilot pressure of the solenoid valve unit 41, the supply air is supplied to the supply flow path 44. Therefore, the supply air flows to the vacuum generation mechanism 50 and negative pressure is generated.

The supply air is also taken into the seal valve flow path 53 that branches from the supply flow path 44, and the supply air flows into the pressure receiving chamber 68, as shown in FIG. 4. As a result, the piston portion 66 is moved to the seal opening 65 side against the bias force of the second elastic part 72, such that the constricted diameter portion 66c of the piston portion 66 contacts and pushes against the valve plug 76. As a result, the valve plug 76 moves in a direction away from the seal opening 65 to open the seal opening 65, and the negative pressure of the vacuum generation mechanism 50 is transmitted to the vacuum port 38 through the negative pressure flow path 62. Therefore, it is possible to generate the suction force in the device such as the suction pad connected to the vacuum port 38.

On the other hand, when the valve mechanism 42a is in the closed state and the break valve 42b is in the open state, the supply of the supply air is cut off, and the pressure of the pressure receiving chamber 68 drops. Therefore, the piston portion 66 is moved in a direction away from the seal opening 65 due to the bias force of the second elastic part 72. In accordance with this, the valve plug 76 is pressed toward the seal opening 65 by the bias of the first elastic part 74, to block the seal opening 65. In other words, in FIG. 5, the seal valve mechanism 70 enters the closed state, and the flow path from the negative pressure flow path 62 to the vacuum generation mechanism 50 is blocked.

Figure 5:
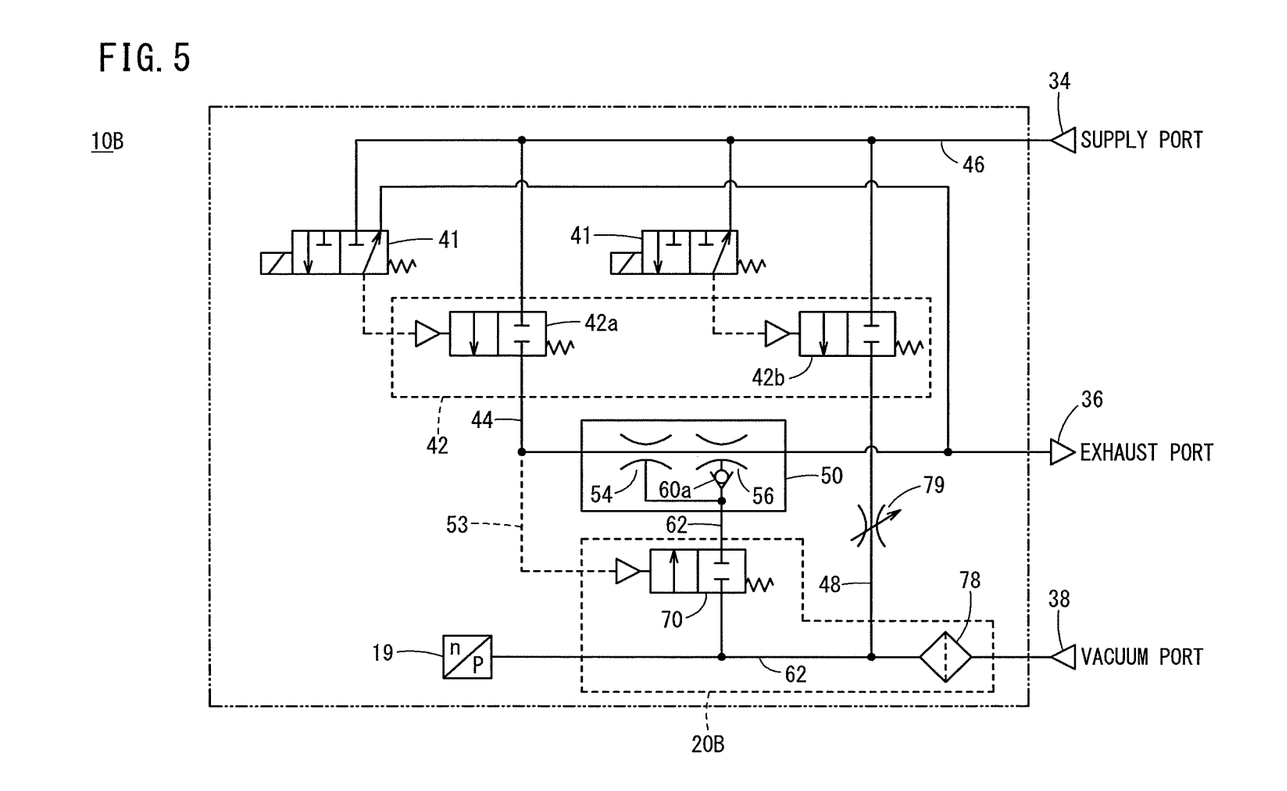
FIG. 5 is an air circuit diagram of the vacuum ejector with the seal valve unit of FIG. 4 attached thereto.

As a result, all of the break air supplied from the break valve 42b can be supplied to the vacuum port 38 side, without flowing out from the vacuum generation mechanism 50. Therefore, it is possible to supply the vacuum port 38 with a large amount of the break air at a high pressure.

As described above, according to the present embodiment, it is possible to configure an optimal vacuum ejector 10A or 10B by selecting the attachment unit 20 from among the filter unit 20A and the seal valve unit 20B, according to the intended use.

Due to the configuration in which the seal valve mechanism 70 enters the open state due to the pilot pressure of the supply air and enters the closed state when the supply air is cut off, there is no need for the supply of air for keeping the seal valve mechanism 70 in the closed state. Therefore, when the high-pressure break air is supplied, the seal valve mechanism 70 can be reliably kept in the closed state.

Furthermore, in the seal valve mechanism 70, the seal opening 65 is formed in the negative pressure flow path 62 between the vacuum generation mechanism 50 and the break flow path 48, and the seal valve mechanism 70 is formed by the valve plug 76 that is biased toward the seal opening 65 from the break flow path 48 side to block the seal opening 65 and the piston portion 66 that receives the pressure of the supply air to move the valve plug 76 in a direction away from the seal opening 65. In this way, the valve plug 76 can reliably seal the seal opening 65 by being biased toward the seal opening 65 due to the break pressure of the break flow path 48. Therefore, even when the break pressure on the break flow path 48 side has increased, the negative pressure flow path 62 can be reliably sealed without having the valve plug 76 open.

Furthermore, in the seal valve mechanism 70, the constricted diameter portion 66c with a smaller diameter than the seal opening 65 is formed at the tip of the piston portion 66, and the valve plug 76 is configured to be pressed by this constricted diameter portion 66c. In this way, it is possible to press the valve plug 76 through the seal opening 65, by setting the diameter of the constricted diameter portion 66c of the piston portion 66 to be less than the diameter of the seal opening 65.

Furthermore, the seal valve mechanism 70 is provided with the first elastic part 74 that biases the valve plug 76 toward the seal opening 65 and the second elastic part 72 that biases the piston portion 66 to move in a direction away from the valve plug 76. Therefore, it is possible to reliably set the seal valve mechanism 70 to the closed state by biasing the valve plug 76 forming the seal valve mechanism 70 toward the seal opening 65.

Second Embodiment

Figure 6:
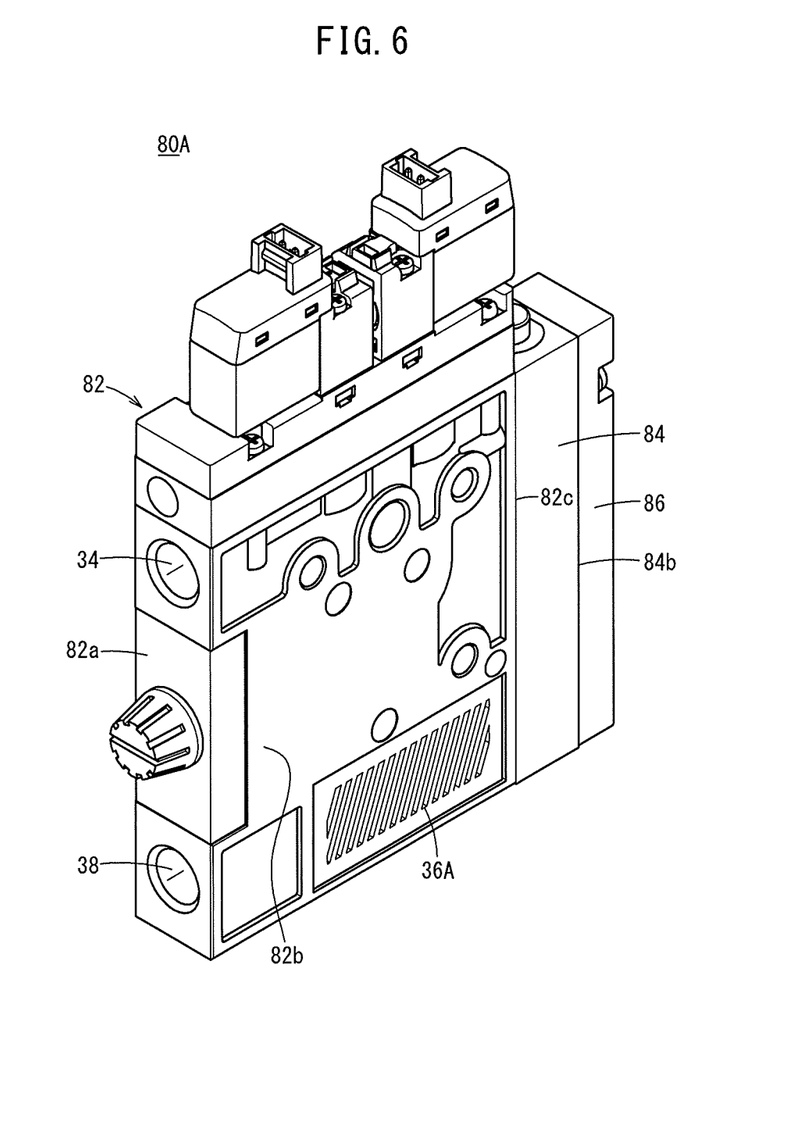
FIG. 6 is a perspective view of a vacuum ejector according to a second embodiment of the present invention.

As shown in FIG. 6, a vacuum ejector 80A according to an aspect of the second embodiment is provided with the supply port 34 and the vacuum port 38 on one side surface 82a of a main body 82, and has an exhaust section 36A formed on a front surface 82b. An ejector unit 84 is attached to another side surface 82c of the main body 82. This ejector unit 84 is attached to the main body 82 in a detachable manner. A head cover 86 that blocks an open portion of the ejector unit 84 is attached to a side end portion 84b of the ejector unit 84. This vacuum ejector 80A is provided with a valve and a suction filter inside the main body 82, but does not include the seal valve mechanism 70.

Figure 7:
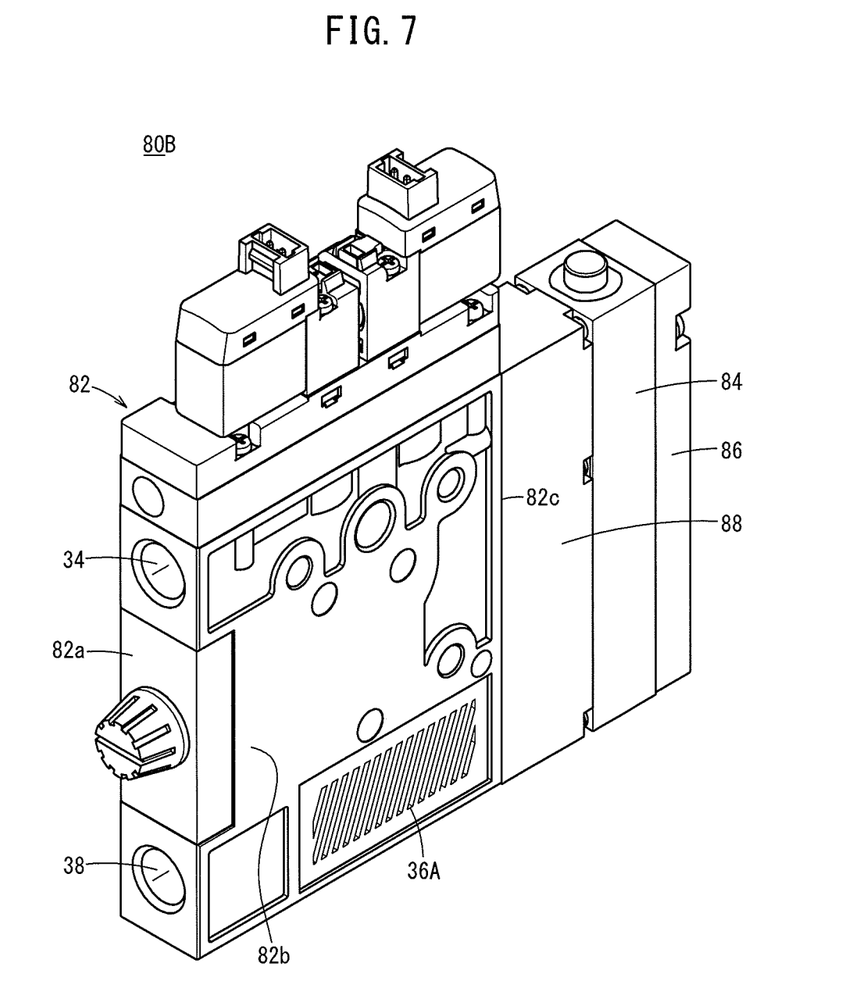
FIG. 7 is a perspective view of a state in which the seal valve unit is attached to the vacuum ejector of FIG. 6.

As shown in FIG. 7, a vacuum ejector 80B that includes a seal valve is formed by attaching a seal valve unit 88 between the main body 82 and the ejector unit 84. The vacuum ejector 80B can generate a higher break pressure than the vacuum ejector 80A, by including the seal valve that blocks the flow path between the break flow path and the vacuum generation mechanism. In this way, in the present embodiment as well, it is possible to form the vacuum ejectors 80A and 80B configured in accordance with an intended use by attaching or detaching the seal valve unit 88. The following is a detailed description of the vacuum ejectors 80A and 80B.

Figure 8:
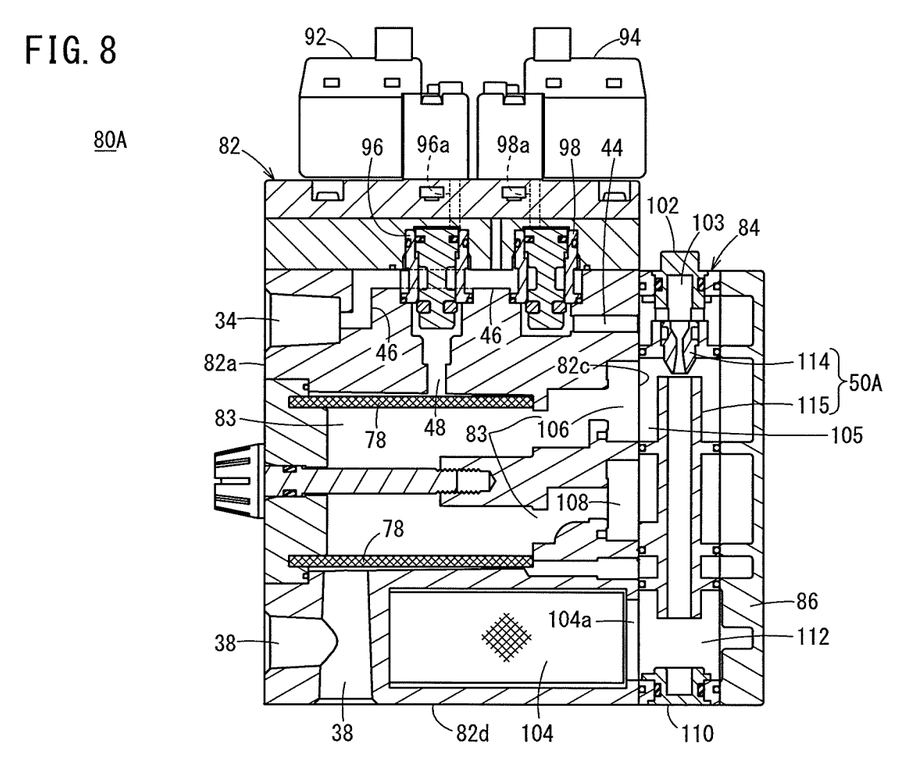
FIG. 8 is a cross-sectional view of the vacuum ejector of FIG. 6.

As shown in FIG. 8, the main body 82 of the vacuum ejector 80A is provided with the supply port 34, the vacuum port 38, solenoid valves 92 and 94, a break valve 96, a supply valve 98, the suction filter 78, a negative pressure flow path 83, and a silencer 104. The supply port 34 is provided on the one side surface 82a of the main body 82. The supply port 34 connects the break valve 96 and the supply valve 98, via the intake air flow path 46.

The break valve 96 is connected to a break solenoid valve 92 via a pilot flow path 96a. The break solenoid valve 92 supplies the pilot air to the break valve 96 via the pilot flow path 96a. The break valve 96 enters the open state when the pilot air is supplied from the break solenoid valve 92, and outputs the break air to the break flow path 48 connected to an outlet of the break valve 96.

The supply valve 98 is connected to the supply solenoid valve 94, via a pilot flow path 98a. The supply solenoid valve 94 supplies the pilot air to the supply valve 98 via the pilot flow path 98a. The supply valve 98 enters the open state when the pilot air is supplied from the supply solenoid valve 94, and outputs the supply air to the supply flow path 44 connected to the outlet of the supply valve 98. One end of the supply flow path 44 extends to the side surface 82c of the main body 82 to open in the side surface 82c.

The suction filter 78 is attached to a boundary portion between the negative pressure flow path 83 and the break flow path 48 and to a boundary position between the negative pressure flow path 83 and the vacuum port 38. In this way, the break flow path 48 is connected to the negative pressure flow path 83 via the suction filter 78.

The negative pressure flow path 83 branches toward the side surface 82c of the main body 82. One branch of the negative pressure flow path 83 becomes a first connection opening 106 that opens in the side surface 82c, and the other branch of the negative pressure flow path 83 becomes a second connection opening 108 that opens in the side surface 82c. In the vacuum ejector 80A that does not include the seal valve, the first connection opening 106 is connected to a suction chamber 105 of the ejector unit 84, and the second connection opening 108 is blocked by the ejector unit 84.

The vacuum port 38 is connected to the negative pressure flow path 83 via the suction filter 78. The vacuum port 38 branches into two portions, with one portion formed in the side surface 82a of the main body 82 and the other portion formed in a side surface 82d of the main body 82. However, the vacuum port 38 does not need to be branched. The silencer 104 is connected to an exhaust connection opening 104a that opens in the side surface 82c of the main body 82. The silencer 104 is provided within the exhaust section 36A that is provided on the front surface 82b of the main body 82, and releases the supply air discharged from the ejector unit 84 to the outside while restricting the exhaust noise.

The ejector unit 84 of the vacuum ejector 80A includes a supply air intake section 103, a nozzle 114, a diffuser 115, the suction chamber 105, and an exhaust chamber 112. The supply air intake section 103 is provided on the top end side of the ejector unit 84, and both ends thereof are open. The open portion of the supply air intake section 103 on the main body 82 side is connected to the supply flow path 44. The open portion of the supply air intake section 103 on the head cover 86 side is sealed by the head cover 86. The top end of the supply air intake section 103 is sealed by a cap 102.

The nozzle 114 is arranged between the supply air intake section 103 and the suction chamber 105. The diffuser 115 is arranged on the downstream side of the nozzle 114. The diffuser 115 is tube-shaped, has one end in communication with the suction chamber 105, and has the other end in communication with the exhaust chamber 112. The diffuser 115 is arranged at a prescribed distance from the nozzle 114 to form a gap, and air in the suction chamber 105 can be sucked through the gap. In this way, the nozzle 114 and the diffuser 115 form the vacuum generation mechanism 50A of the present embodiment.

The exhaust chamber 112 is provided on the downstream side of the diffuser 115. The exhaust chamber 112 opens in the main body 82 side surface of the ejector unit 84, and is in communication with the exhaust connection opening 104a. The bottom end of the exhaust chamber 112 is sealed by a cap 110.

The head cover 86 is attached to the side end portion 84b of the ejector unit 84, and seals the openings of the supply air intake section 103, the suction chamber 105, and the exhaust chamber 112. The head cover 86 may be formed integrally with the ejector unit 84.

The vacuum ejector 80A configured as described above is the same as the vacuum ejector 10A of the first embodiment, aside from having the negative pressure flow path 83 provided on the main body 82 side, and operates in the same manner. In other words, the break air supplied from the break flow path 48 is supplied to the vacuum port 38, and a portion of the break air also flows out to the ejector unit 84. This type of vacuum ejector 80A has a simplified structure by not including the seal valve mechanism 70.

Figure 9:
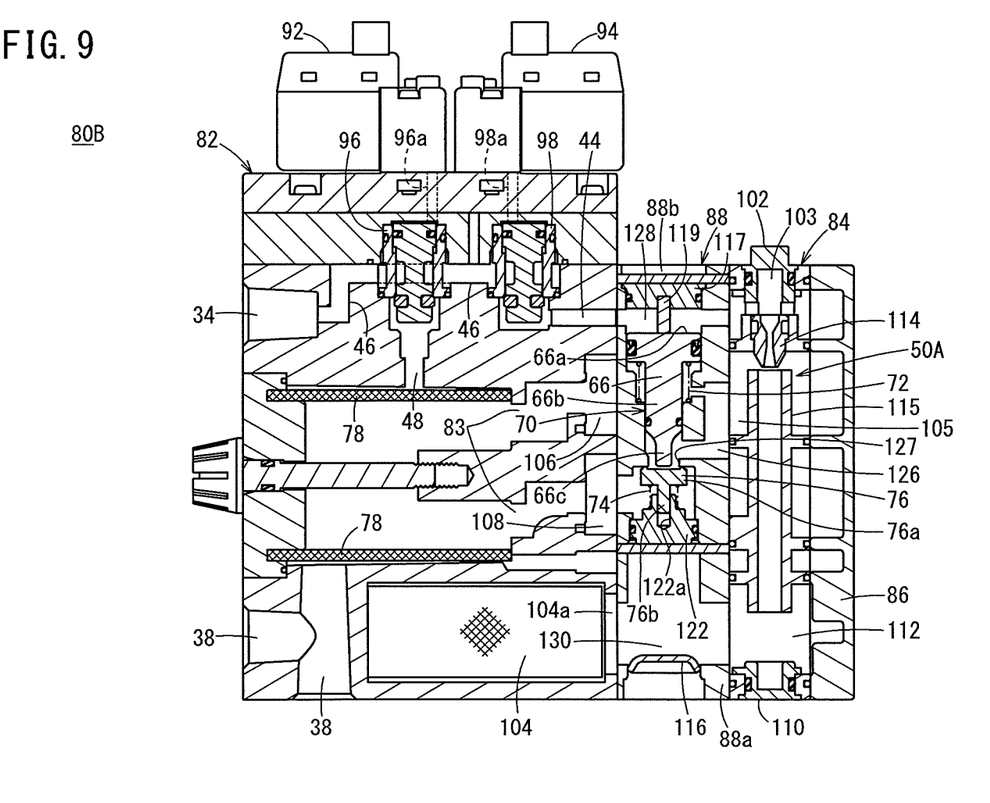
FIG. 9 is a cross-sectional view of the vacuum ejector of FIG. 7.

The following describes the vacuum ejector 80B to which the seal valve unit 88 is attached. As shown in FIG. 9, in the vacuum ejector 80B, the seal valve unit 88 is attached between the main body 82 and the ejector unit 84.

The seal valve unit 88 includes a case 88a, and includes a negative pressure flow path 126, the seal valve mechanism 70, and an exhaust flow path 130 inside the case 88a.

The case 88a is provided with a penetration hole 88b that penetrates in the longitudinal direction. One end of the penetration hole 88b is sealed by an end cap 117. A regulating pin 119 is formed protruding from the end cap 117. The regulating pin 119 contacts the pressure receiving portion 66a of the piston portion 66 of the seal valve mechanism 70, to stop the piston portion 66 at a position distanced from the end cap 117. A supply flow path 128 is formed between the piston portion 66 and the end cap 117. One end of the supply flow path 128 is in communication with the supply flow path 44 of the main body 82, and the other end of the supply flow path 128 is in communication with the supply air intake section 103 of the ejector unit 84.

The negative pressure flow path 126 is separated from the supply flow path 128 by the piston portion 66 of the seal valve mechanism 70. Furthermore, the supply flow path 128 is separated from the exhaust flow path 130 by a cap 122. The supply flow path 128 is in communication with the suction chamber 105 of the ejector unit 84, and also in communication with the second connection opening 108 of the main body 82. In other words, the negative pressure flow path 83 of the main body 82 is connected to the suction chamber 105 of the ejector unit 84 via the negative pressure flow path 126 of the seal valve unit 88. The first connection opening 106 of the main body 82 is blocked by the case 88a of the seal valve unit 88.

A seal opening 127 with an inner diameter that is smaller than other parts of the negative pressure flow path 126 is formed in the negative pressure flow path 126. The seal valve mechanism 70 controls whether the negative pressure flow path 126 is open or sealed by opening and closing the seal opening 127.

The seal valve mechanism 70 includes the valve plug 76 that blocks the seal opening 127 and the piston portion 66 that moves the valve plug 76 away from the seal opening 127 to open the seal opening 127. The valve plug 76 is arranged farther on the exhaust flow path 130 side than the seal opening 127.

The valve plug 76 includes a valve portion 76a formed with a larger diameter than the seal opening 127 and a shaft portion 76b that extends from the center of the valve portion 76a. A seal member (not shown in the drawings) is attached to the surface of the valve portion 76a, and the valve portion 76a blocks the seal opening 127 using this seal member. The shaft portion 76b is inserted into a guide hole 122a provided in the cap 122. The valve plug 76 can move in the axial direction of the piston portion 66, while being guided by the guide hole 122a. Furthermore, the first elastic part 74 formed by a coil spring, for example, is attached to the outside of the shaft portion 76b of the valve plug 76. One end of the first elastic part 74 contacts the cap 122, and the other end of the first elastic part 74 contacts the valve portion 76a of the valve plug 76. The valve plug 76 is biased toward the seal opening 127 by the first elastic part 74.

The piston portion 66 is arranged between the negative pressure flow path 126 and the supply flow path 128 sealed by the end cap 117. The piston portion 66 includes the pressure receiving portion 66a that faces the supply flow path 128, the main body 66b that is formed with a smaller diameter than the pressure receiving portion 66a, and the constricted diameter portion 66c that is formed at the tip side of the main body 66b. The pressure receiving portion 66a receives the pressure of the supply air to move the piston portion 66 to the seal opening 127 side. The constricted diameter portion 66c is formed with a diameter that is smaller than the inner diameter of the seal opening 127, and is configured to be able to be inserted into the seal opening 127 without blocking the seal opening 127. Furthermore, the second elastic part 72 is formed on the outer circumference of the main body 66b. The second elastic part 72 is formed by a coil spring, for example, and biases the piston portion 66 in a direction away from the seal opening 127. The regulating pin 119 that extends in the axial direction is provided to the end cap 117. The movement range of the piston portion 66 is regulated by the regulating pin 119.

The exhaust flow path 130 is in communication with the exhaust chamber 112 of the ejector unit 84 and the silencer 104 of the main body 82. The bottom end of the exhaust flow path 130 is sealed by a head cap 116.

The following describes the operation of the vacuum ejector 80B configured as described above, while referencing FIGS. 9 and 10. In the vacuum ejector 80B, the compressed air taken in from the supply port 34 is supplied to the supply valve 98 and the break valve 96, via the intake air flow path 46. When the supply valve 98 enters the closed state due to the pilot pressure of the supply solenoid valve 94, the supply air is supplied to the ejector unit 84 through the supply flow path 44 and the supply flow path 128. Therefore, the supply air flows through the vacuum generation mechanism 50A and the air inside the suction chamber 105 is suctioned to generate the negative pressure.

As shown in FIG. 9, the supply air acts in the pressure receiving portion 66a of the piston portion 66 facing the supply flow path 128 to push the piston portion 66 to the seal opening 127 side. In this way, the piston portion 66 is moved to the seal opening 127 side against the bias force of the second elastic part 72, and the constricted diameter portion 66c of the piston portion 66 contacts and pushes the valve plug 76. As a result, the valve plug 76 moves away from the seal opening 127 to open the seal opening 127, and the negative pressure of the suction chamber 105 is transmitted to the vacuum port 38. In this way, it is possible to generate the suction force in the device such as the suction pad connected to the vacuum port 38.

On the other hand, when the supply valve 98 is in the closed state and the break valve 96 is in the open state, the supply of the supply air is cut off and the pressure of the supply flow path 128 drops. Therefore, the piston portion 66 is moves in a direction away from the seal opening 127 due to the bias force of the second elastic part 72. In accordance with this, the valve plug 76 is biased by the first elastic part 74 to be pressed toward the seal opening 127 and block the seal opening 127. In other words, in FIG. 10, the seal valve mechanism 70 enters the closed state to block the flow path between the negative pressure flow path 83 and the suction chamber 105.

Figure 10:
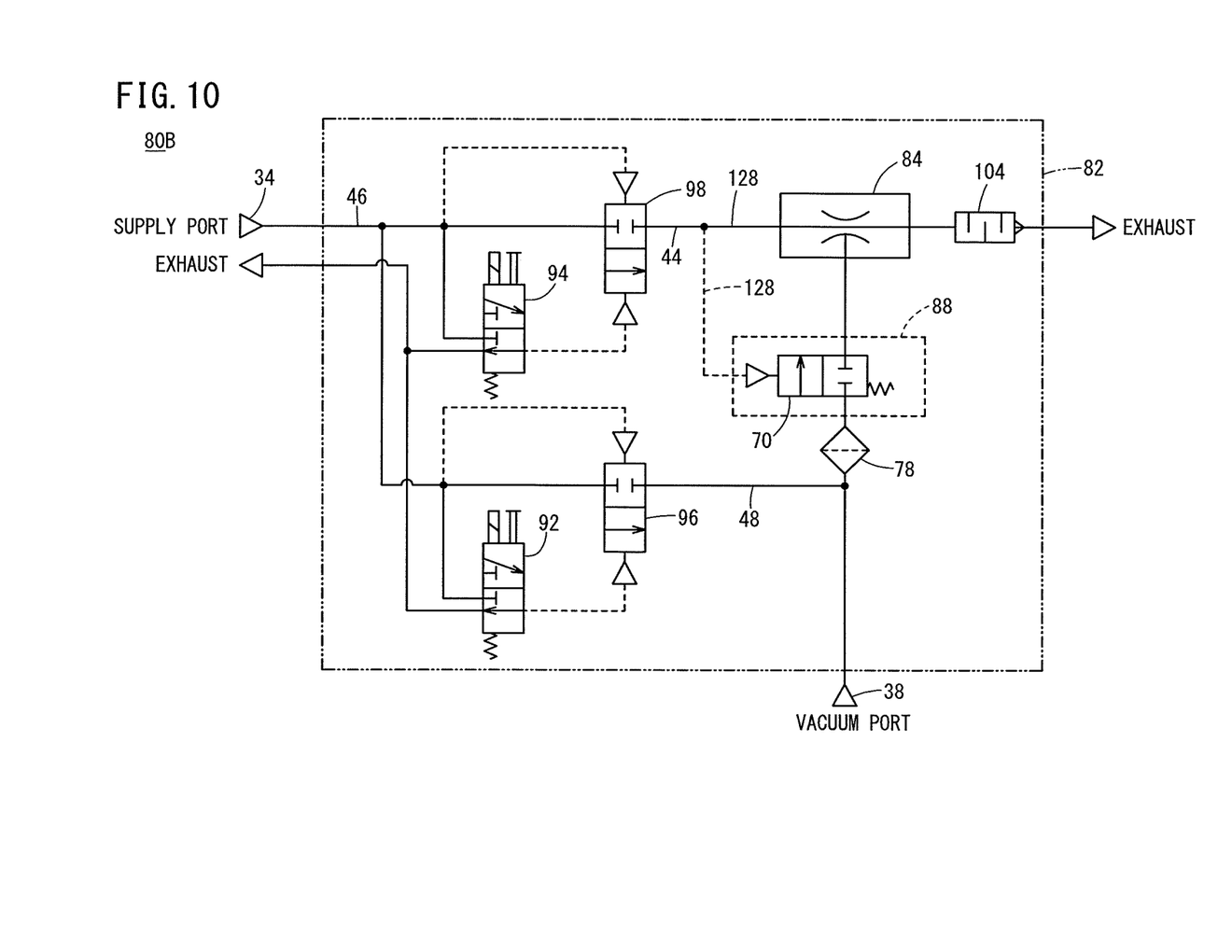
FIG. 10 is an air circuit diagram of the vacuum ejector of FIG. 7.

As a result, all of the supply air supplied from the break valve 96 flows to the vacuum port 38 side, without flowing out from the diffuser 115. In this way, it is possible to supply the vacuum port 38 with a large amount of high-pressure break air.

In the manner described above, in the vacuum ejector 80B of the present embodiment as well, it is possible to easily add the seal valve mechanism 70 by attaching the seal valve unit 88. As a result, it is possible to configure the vacuum ejector 80A or 80B that can output the desired break pressure in accordance with the intended use, simply by attaching or detaching the seal valve unit 88. The remaining configuration of the vacuum ejector 80B operates in the same manner as the portion of the configuration common to the vacuum ejector 10B.

The above describes examples of preferred embodiments of the present invention, but the technical scope of the invention is not limited to the above described embodiments, and it is apparent that various alterations can be made without deviating from the scope of the present invention.

What is claimed is:

1. A vacuum ejector comprising:
    a supply port supplied with compressed air;
    a vacuum port connected to a suction unit;
    a vacuum generation mechanism configured to generate negative pressure due to an effect of supply air supplied from the supply port;
    a break valve configured to supply break air to the vacuum port;
    a supply flow path configured to connect the supply port and the vacuum generation mechanism, and including a supply valve therein;
    a negative pressure flow path configured to connect the vacuum generation mechanism and the vacuum port;
    a break flow path configured to connect the break valve and the negative pressure flow path; and
    a seal valve mechanism arranged in the negative pressure flow path between the vacuum generation mechanism and the break flow path, and configured to prevent the break air that passes through the break flow path to be supplied to the vacuum port from flowing out to the vacuum generation mechanism,
    wherein the seal valve mechanism is configured to enter an open state due to supply of the supply air from the supply valve, and enter a closed state when the supply of the supply air from the supply valve stops,
    wherein the seal valve mechanism includes:
    a seal opening formed by constricting a diameter of the negative pressure flow path;
    a valve plug configured to be biased toward the seal opening from the break flow path side to block the seal opening; and
    a piston portion configured to receive pressure of the supply air to move the valve plug in a direction away from the seal opening.

2. The vacuum ejector according to claim 1, wherein a constricted diameter portion with a diameter smaller than a diameter of the seal opening is formed at a tip portion of the piston portion, and the constricted diameter portion is configured to contact and push the valve plug to move the valve plug away from the seal opening.

3. The vacuum ejector according to claim 2, wherein the seal valve mechanism includes:
    a first elastic part configured to bias the valve plug toward the seal opening; and
    a second elastic body configured to bias the piston portion in a direction away from the valve plug.

* * * * *